United States Patent
Marks et al.

(10) Patent No.: US 11,127,164 B2
(45) Date of Patent: Sep. 21, 2021

(54) IMAGE PROCESSING SYSTEM AND METHOD FOR LANDMARK LOCATION ESTIMATION WITH UNCERTAINTY

(71) Applicant: Mitsubishi Electric Research Laboratories, Inc., Cambridge, MA (US)

(72) Inventors: Tim Marks, Newton, MA (US); Abhinav Kumar, Salt Lake City, UT (US); Wenxuan Mou, Cambridge, MA (US); Chen Feng, Cambridge, MA (US); Xiaoming Liu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 103 days.

(21) Appl. No.: 16/592,822

(22) Filed: Oct. 4, 2019

(65) Prior Publication Data
US 2021/0104068 A1   Apr. 8, 2021

(51) Int. Cl.
*G06T 7/77* (2017.01)
*G06K 9/62* (2006.01)
*G06N 3/04* (2006.01)

(52) U.S. Cl.
CPC .............. *G06T 7/77* (2017.01); *G06K 9/6257* (2013.01); *G06N 3/04* (2013.01); *G06T 2207/10016* (2013.01); *G06T 2207/20076* (2013.01); *G06T 2207/20081* (2013.01); *G06T 2207/30196* (2013.01); *G06T 2207/30201* (2013.01)

(58) Field of Classification Search
None
See application file for complete search history.

(56) References Cited

U.S. PATENT DOCUMENTS

| 10,515,259 | B2 * | 12/2019 | Jones | G06T 7/75 |
| 2012/0121161 | A1 * | 5/2012 | Eade | G05D 1/0253 |
| | | | | 382/153 |
| 2015/0186748 | A1 * | 7/2015 | Cootes | G06K 9/00281 |
| | | | | 382/159 |

OTHER PUBLICATIONS

Nitesh et al., "Structured Aleatoric Uncertainty in Human Pose Estimation," CVPT Workshop on Uncertainty and Robustness in Deep Visual Learning. Jun. 16, 2019. pp. 50-53.

* cited by examiner

*Primary Examiner* — Vikkram Bali
(74) *Attorney, Agent, or Firm* — Gennadiy Vinokur; Hironori Tsukamoto

(57) ABSTRACT

A controller for executing a task based on probabilistic image-based landmark localization, uses a neural network, which is trained to process images of objects of a type having a structured set of landmarks to produce a parametric probability distribution defined by values of parameters for a location of each landmark in each processed image. The controller submits the set of input images to the neural network to produce the values of the parameters that define the parametric probability distribution over the location of each landmark in the structured set of landmarks of each input image. Further, the controller determines, for each input image, a global landmark uncertainty for the image based on the parametric probability distributions of landmarks in the input image and executes the task based on the parametric probability distributions of landmarks in each input image and the global landmark uncertainty of each input image.

20 Claims, 16 Drawing Sheets

|  | $NME_{interocular}(\%)$ | | |
|---|---|---|---|
|  | Common | Challenge | Full |
| Dual State Recurrent Network (DSRN) | 4.12 | 9.68 | 5.21 |
| Component Process module(CPM)+supervision by regression (SBR) | 3.28 | 7.58 | 4.10 |
| Style Aggregated Network (SAN) | 3.34 | 6.60 | 3.98 |
| Deep Alignment Network (DAN) | 3.19 | 5.24 | 3.59 |
| DU-Net | 2.97 | 5.53 | 3.47 |
| UGLLI | 2.78 | 5.08 | 3.23 |

FIG. 6A

|  | $NME_{box}(\%)\ (\downarrow)$ | | $AUC^7_{box}(\%)\ (\uparrow)$ | |
|---|---|---|---|---|
|  | 300-W | Menpo | 300-W | Menpo |
| 2D face alignment network (2D-FAN) | 2.56 | 2.32 | 66.90 | 67.40 |
| Kernal density network (KDN)-Gaussian | 2.49 | 2.26 | 67.30 | 68.40 |
| UGLLI | 2.24 | 2.20 | 68.27 | 69.85 |

FIG. 6B

| Change from UGLLI model: | | NME$_{box}$(%) | | AUC$^7_{box}$(%) | |
| --- | --- | --- | --- | --- | --- |
| Changed | From → To | 300-W | Menpo | 300-W | Menpo |
| Supervision | All HGs → Last HG | 2.47 | 2.34 | 65.07 | 68.06 |
| Loss | GLL → MSE | 2.40 | 2.28 | 66.05 | 68.70 |
| | Heatmap → Direct | 4.95 | 4.60 | 34.45 | 42.05 |
| Mean Estimator | ReLU → s-amax | 3.01 | 2.81 | 57.44 | 61.30 |
| | ReLU → τ-s-amax | 2.26 | 2.19 | 67.97 | 69.94 |
| — | UGLLI | 2.24 | 2.20 | 68.27 | 69.85 |

FIG. 8

IMAGE PROCESSING SYSTEM AND METHOD FOR LANDMARK LOCATION ESTIMATION WITH UNCERTAINTY

TECHNICAL FIELD

This invention relates generally to image and video processing, and more particularly to estimation of the locations of landmarks on objects.

BACKGROUND

Landmark localization refers to estimating locations of multiple predetermined landmarks of an object in an image. The landmark localization is performed on images of different types of objects that have a structured set of landmarks, such as human faces and human bodies. If the landmark localization is performed on human faces images, then the landmark localization is known as face alignment, and includes estimating locations in the image of a structured set of landmarks that includes predefined facial landmark points such as eye and mouth corners. If the landmark localization is performed on human body images, then the landmark localization is known as human body pose estimation, and includes estimating locations in the image of a structured set of landmarks of the body that includes predefined anatomical landmark points such as elbow and knee joints.

For example, landmark localization on face images, i.e., face alignment, is a fundamental step for face-related tasks of many computer vision applications including facial expression recognition, head pose estimation, 3D face modelling, human-robot interaction, and remote photoplethysmography. The achievement of all these tasks depends heavily on accuracy of localization of facial landmarks. However, because of variation of different face images due to factors such as face shape, facial expressions and orientation, lighting, and image quality, face alignment inevitably suffers from errors due to uncertainty of landmark localization.

Many approaches to both the face alignment and the body pose estimation are based on deep learning models. Current deep learning models for these tasks typically use a cascade of deep networks, which is a network architecture that was developed for the human body pose estimation.

Such deep learning models are heatmap-based, because they are trained using a distance ($l_2$ distance, which is a Euclidian distance) between a predicted heatmap for each landmark and a proxy ground-truth heatmap. The proxy groundtruth heatmap can be generated by placing an isotropic Gaussian distribution with small fixed variance at a ground-truth landmark location. Further, the deep learning model determines the landmarks' locations using the argmax of each predicted heatmap, i.e., the pixel location at which the heatmap has its maximum value.

Deep learning models improve accuracy of landmark localization. However, this approach suffers from several disadvantages. For example, since the heatmap's argmax can only be determined to the nearest pixel, quantization errors are introduced during the determining of the landmarks locations.

Most deep learning methods for landmark localization output a single location for each landmark, and the network has no way to output an uncertainty level of each location estimate. One deep learning method for face alignment uses a non-parametric probability density function to estimate the location of each landmark. In the non-parametric approach, a kernel density network is obtained by convolving the heatmaps with a fixed isotropic Gaussian kernel. Non-parametric kernel density network models are a way to approximate a large continuous distribution as a union of a very large discrete set of simple parametric models. However, the non-parametric approach may require large amounts of training data in order to obtain accurate results. Furthermore, the non-parametric approach is suboptimal when the distribution that is being modelled non-parametrically is close to a shape of a simple parametric distribution. Also, this non-parametric approach is limited by the resolution of the underlying grid of pixels of the heatmap and the size of the fixed kernel; for example, distributions that are narrower than the size of the kernel cannot be accurately modelled using the non-parametric approach. Therefore, there is a need to develop systems and methods to validate and improve accuracy of estimation of landmark location.

SUMMARY

It is an object of some embodiments to improve accuracy of landmark localization of multiple predetermined landmarks of an object in an image. Additionally, or alternatively, it is an object of some embodiments to improve accuracy of execution of tasks dependent on accuracy of the landmark localization. Additionally, or alternatively, it is an object of some embodiments to improve accuracy of execution of these tasks even in presence of errors in the landmark localization.

Some embodiments are based on recognition that errors in the landmark localization are possible, but for the purpose of subsequent execution of the landmark-location-dependent tasks, these errors can be recoverable. For example, for a vehicle driver monitoring system that performs face alignment in a sequence of images of the face of the driver, if for some images the face alignment is uncertain, usage of that image for the monitoring tasks can be reduced, e.g., the weight of the image in collective execution can be reduced, or the image can be skipped all together.

To that end, some embodiments are based on recognition that in addition to landmark localization it is beneficial to estimate uncertainty of such estimation and to use these uncertainties to guide subsequent execution of the tasks. Further, some embodiments are based on realization that an estimation of uncertainty of landmark localization should not be a separate process but should be integrated in the landmark localization itself. Specifically, if a neural network is trained to perform the landmark localization, such a neural network should output not only landmark locations, but also uncertainty of the estimated locations. In such a manner, the neural network can be trained end-to-end for the achievement of both objectives.

However, configuration and training of such a dual objective neural network creates additional challenges related to the complexity of non-parametric data and the difference between uncertainties of landmark localization for each landmark vs. uncertainty for the entire image. Some embodiments address these problems in two steps. First, the neural network used by some embodiment outputs not the location of the landmark, but a parametric probability distribution over a location of each landmark in an image. The parametric probability estimation involves determining a small number of parameters of a parametric model to represent the probability distribution over the location of each landmark in the image. Thus, the probability distribution over the location of each landmark is represented using a small parametric model, rather than using a large non-parametric model. In some embodiments, different parameters of the parametric probability distribution for each landmark define point estimates of the location of the landmark and an uncertainty of the location estimation for each landmark. In such a manner, a single output of the neural network can represent both the location of the landmark and uncertainty of its estimation. In such a manner, the neural network of some embodiments is trained for dual objectives without significant increase of computational effort and the amount of outputted data.

An example of a parametric probability distribution defined by values of parameters for a location of each landmark in each processed image is a Gaussian distribution, wherein the parameters determine a mean and a covariance matrix of the Gaussian distribution. In this example, the mean defines the point of location of the landmark, and the covariance matrix defines the uncertainty. Note that the covariance matrix defines the multidimensional (e.g., two-dimensional) shape and structure of the Gaussian probability distribution over the landmark's location.

Further, some embodiments determine parametric distribution for each landmark in the input image. In such a manner, the uncertainty estimation can be tailored for each individual landmark. However, some embodiments determine global uncertainty of the input image based on a combination of parameters of the parametric probability distributions determined for the individual landmarks of the input image. For example, in some implementations, the global uncertainty is a single scalar measure that summarizes the uncertainties of all of the individual landmarks locations in the image. The task execution may use this single scalar measure for an input image as a simple measurement to determine how to handle that input image. In such a manner, the accuracy of the task execution is increased.

Some embodiments are based on a realization that the parametric probability distribution for each landmark includes an estimate of the location of the landmark, such that the location of the landmark and an uncertainty of the location estimation for each landmark are derived from parameters of the parametric probability distribution. To this end, some parameters of the parametric probability distribution define a point estimate of the location of the landmark, and other parameters of the parametric probability distribution define the estimated uncertainty of the landmark locations, such as the shape and spread of the probability distribution. However, heatmap-based representations may be suboptimal for estimating some of these parameters. In fact, different parameters may be optimally estimated using different mechanisms.

For example, in some embodiments that estimate a Gaussian probability distribution for each landmark, the mean of the Gaussian probability distribution (which is the point estimate of the landmark's location) is obtained from one or more heatmaps, while the parameters that determine the covariance matrix are obtained by direct regression. Some embodiments determine through experimentation that obtaining the covariance matrix of the Gaussian covariance matrix (which determines the distribution's uncertainty, i.e., its shape and spread) through direct regression, e.g., from the low-dimensional feature values at a bottleneck layer of the neural network, provides more accurate results than obtaining the covariance matrix from heatmaps. That could be because the heatmaps do not have high enough resolution to give good estimates of the size and shape of the distribution. In addition, some embodiments also found experimentally that getting the point estimate of the landmark location (mean of the Gaussian) from heatmaps works better than getting the point estimate through direct regression. To that end, some embodiments compute the point estimate (e.g., the mean of the Gaussian) of the landmark location from heatmaps, while computing the uncertainty (e.g., the shape and spread of the probability distribution) of the landmark location via direct regression.

Additionally, or alternatively, some embodiments are based on realization that the loss function for training such a neural network with probabilistic output should capture that probabilistic nature. To that end, some embodiments train the neural network to provide a mapping from the input images to probability distributions that maximizes a likelihood of groundtruth landmark locations. For example, the neural network can be trained using negative log likelihood as a loss function.

In such a manner, outputting a parametric, e.g., Gaussian, distribution for each landmark location allows to train neural network using a loss function matching the output distribution. E.g., a Gaussian log-likelihood loss function enables simultaneous estimation of landmark locations and their uncertainty. This joint estimation yields good predictions of uncertainty, but it also yields state-of-the-art face alignment results. In such a manner, the dual objective neural network with probabilistic output allows to concurrently estimate the landmark locations and their uncertainties as well as improve the accuracy of the landmark localization.

Additionally, or alternatively, it is an object of some embodiments to provide landmark detection systems for safety-critical applications such as driver monitoring. Along with the landmark location detection, estimation of uncertainty provides additional support for executing tasks related to safety critical applications (e.g., driver monitoring). In some embodiments, a neural network is trained to process images of objects of a type having the structured set of landmarks to produce the parametric probability distribution over a location of each landmark in the image.

In some embodiments, the neural network is a densely connected U-nets (DU-Net) architecture to which two additional branching components are added from one or more U-nets (which are also known as hourglass networks or hourglasses). In some embodiments, the new components are added from all of the hourglasses; in other embodiments, the new components are added from only the final hourglass. The first additional component is a mean estimator, which computes the estimated landmark location in a differentiable manner, where the estimated location of each landmark is computed as a weighted spatial mean of positive elements of a corresponding heatmap. The second component is a Cholesky Estimator Network (CEN), which estimates Cholesky coefficients of a covariance matrix of a 2D Gaussian probability distribution for each landmark location. Estimation of a Gaussian log-likelihood loss (GLL) where the estimated landmark location is used as the mean of the Gaussian distribution, and the estimated covariance matrix is used as the covariance of the Gaussian distribution, enables estimation of the landmark locations and the uncertainty associated with the landmark locations. Such estimation is referred to as Uncertainty with Gaussian Log-Likelihood (UGLLI), which yields both the uncertainty estimation and the landmark location estimation.

For example, the choice of methods for computing the mean and the covariance matrix can be a differentiating factor. Some embodiments are based on a recognition that obtaining point estimates of the landmark locations from the heatmaps yields more accurate estimation of the landmark locations. However, some embodiments are based on a realization that other parameters of the probabilistic distribution are more accurate when obtained by direct regression, rather than from the heatmap. Thus in one embodiment, the locations of the landmarks' probability distributions (e.g., the mean) are obtained from heatmap, while the shape and spread of the landmarks' probability distributions (e.g., the covariance matrix) are obtained by the direct regression.

Additionally, or alternatively, some embodiments are based on realization that because the dual objective neural network outputs parameters of a probabilistic distribution, the probabilistic landmark location estimation can be combined with other probabilistic filters to further improve the accuracy of landmark localization. For example, in some embodiments, the parametric probability distribution of a landmark for a current input image is a Gaussian probability distribution, and the Gaussian probability distribution is determined using a Kalman filter that updates the Gaussian probability distribution determined for the current input image using a Gaussian probability distribution determined for a previous input image. Kalman filtering is based on an assumption that probabilistic distributions involved are Gaussian, so it may be well suited for sequential estimation of landmark locations and uncertainties across subsequent frames of a video.

In some embodiments, tasks are executed based on the estimated global uncertainty. Additionally, or alternatively, in some example embodiments, the tasks are executed based on both of the estimated landmark locations and the estimated global uncertainty. In some example embodiments, if estimated global uncertainty about the locations of multiple landmarks in the image is above a threshold value, then a controller rejects the landmarks estimated from the image for safety-critical applications and subsequently a task is not executed. In some embodiments, if the estimated global uncertainty of the image is below a threshold value then the task is executed.

Accordingly, one embodiment discloses a controller for executing a task based on probabilistic image-based landmark localization. The controller includes an input interface configured to accept a set of input images of a type of object having a structured set of landmarks, a memory configured to store a neural network trained to process images of objects of the type having the structured set of landmarks to produce a parametric probability distribution defined by values of parameters for a location of each landmark in each processed image, and a processor configured to submit the set of input images to the neural network to produce the values of the parameters that define the parametric probability distribution over the location of each landmark in the structured set of landmarks of each input image, determine, for each input image, a global landmark uncertainty for the image based on the parametric probability distributions of landmarks in the input image, and execute the task based on the parametric probability distributions of landmarks in each input image and the global landmark uncertainty of each input image.

BRIEF DESCRIPTION OF THE DRAWINGS

The presently disclosed embodiments are further explained with reference to the attached drawings. The drawings shown are not necessarily to scale, with emphasis instead generally being placed upon illustrating the principles of the presently disclosed embodiments.

FIG. 6A is a table of normalized mean error (NME) comparison between different methods on 300-W Common, Challenge, and Full datasets (Split 1), according to some embodiments.

FIG. 6B is a table of the NME and Area Under the Curve (AUC) comparison between different methods on the 300-W Test (Split 2) and Menpo datasets.

FIG. 8 is a table showing ablation studies on 300-W Test and Menpo datasets using the UGLLI method trained on 300-W Split 2.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

System Overview

Figure 1A:
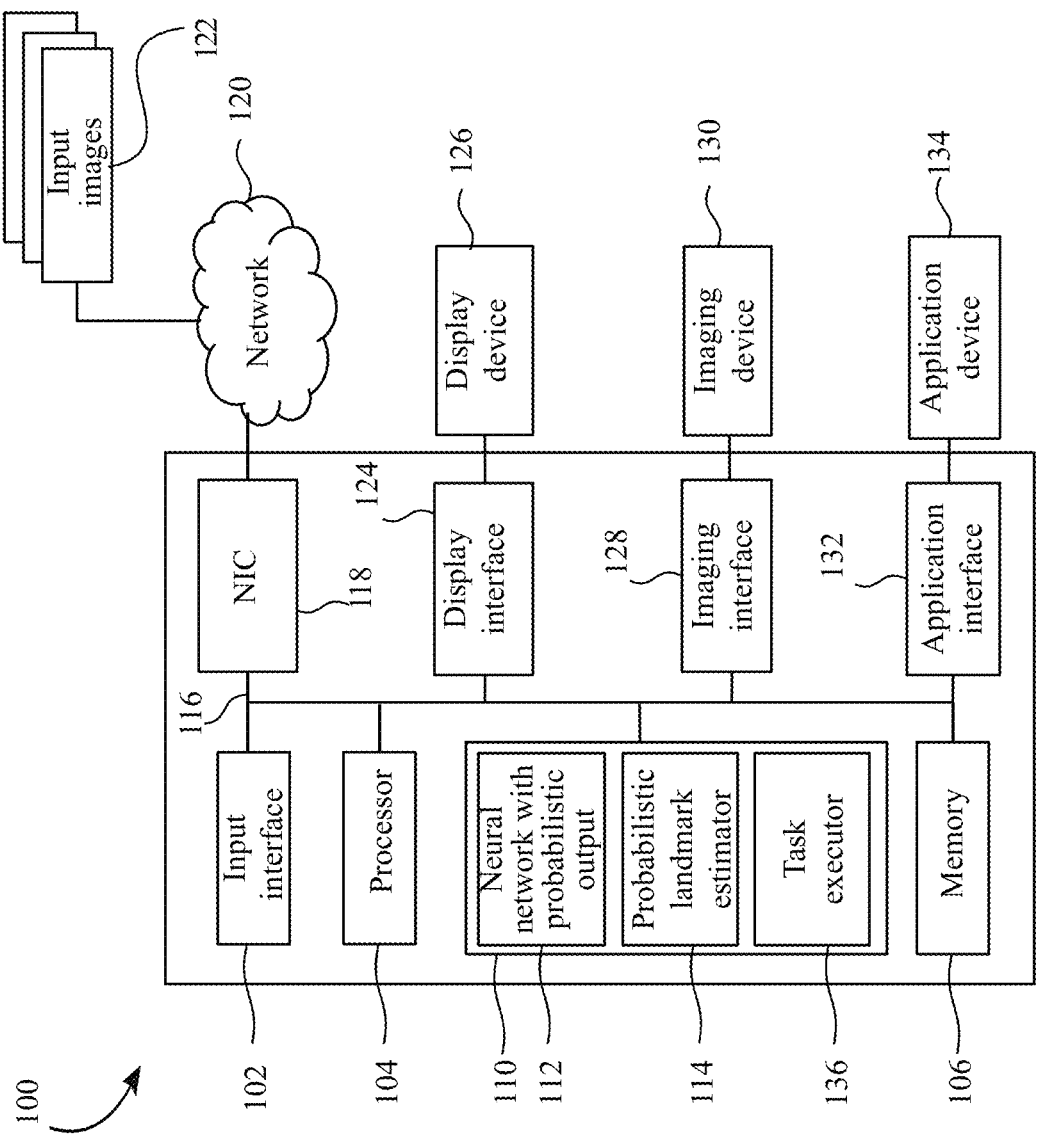
FIG. 1A shows a block diagram of a controller for executing a task based on probabilistic image-based landmark localization, according to some embodiments.

FIG. 1A shows a block diagram of a controller 100 for executing a task based on probabilistic image-based landmark localization, according to some embodiments. For example, in some embodiments, the task is a part of a vehicle driver monitoring system, and may include for example determining face alignment of the vehicle driver. In these embodiments, executing the task involves executing or initiating a course of action, for example, reducing speed of the vehicle and/or changing steering of the vehicle. However, different embodiments enable executions of different systems based on landmark localization in the image.

The controller 100 includes an input interface 102 configured to accept a set of input images 122 of a type of object having a structured set of landmarks. Further, the controller 100 includes a network interface controller (NIC) 118 adapted to connect the controller 100 through a bus 116 to a network 120. Through the network 120, either wirelessly or through wires, the controller 100 may receive the input images 122. As used herein, the structured set of landmarks indicates that the input images are of the same type, such as images of human faces or human bodies.

Figure 1B:
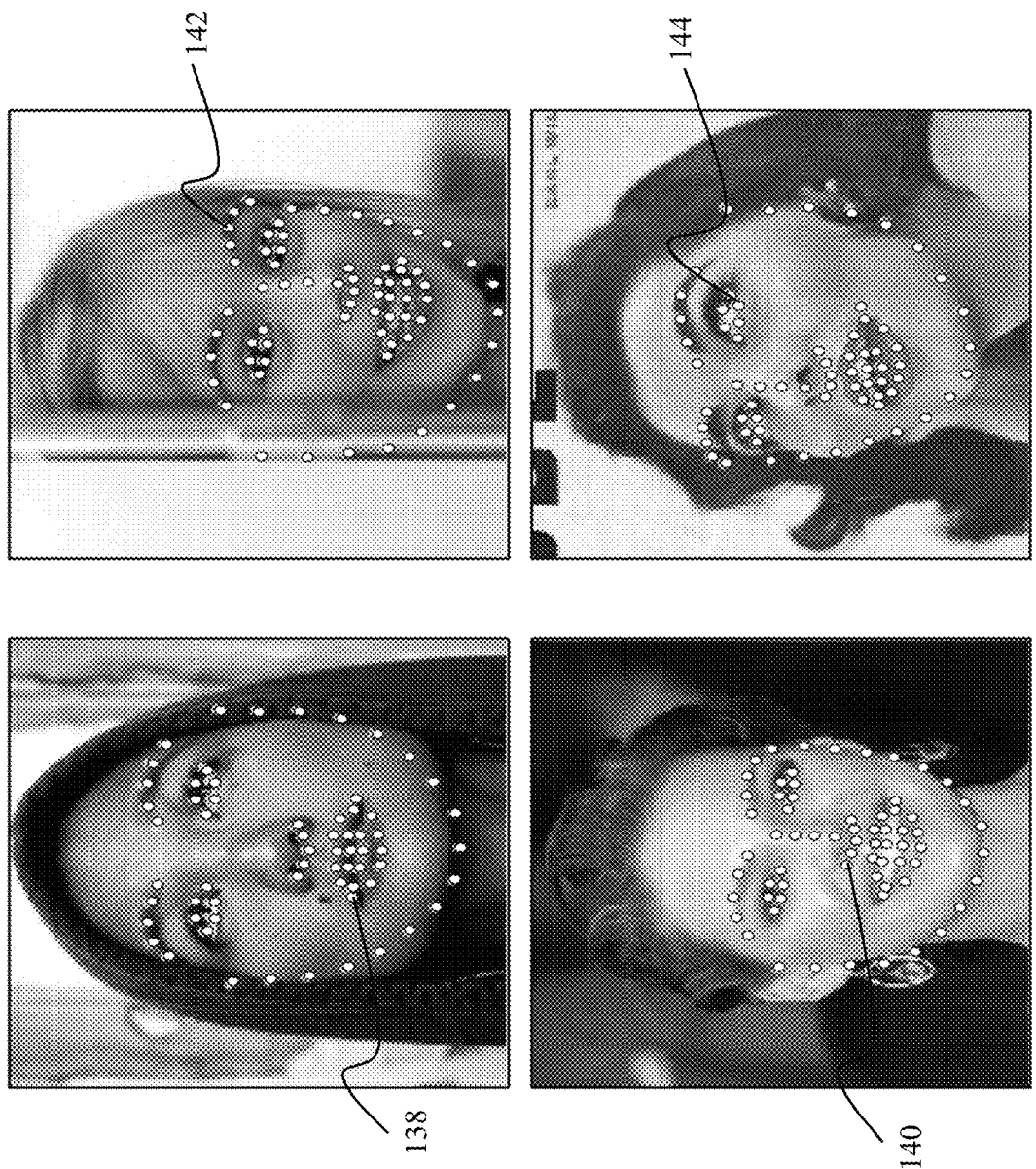
FIG. 1B shows a set of input images of a human face, according to some embodiments.

FIG. 1B shows a set of input images of a human face, according to some embodiments. As shown, the input images may have different faces with different expression and orientation. However, the landmarks of these faces have the same structure to determine the location, shape, and configuration of mouth 138, nose 140, eyebrows 142, eyes 144, etc. In this case, the structured set of landmarks defines specific facial landmarks which are present on a typical face. The set, which contains one or more input images, can include different people's faces, but may be a temporal sequence of images (e.g., video frames) of a single person's face.

Figure 1C:
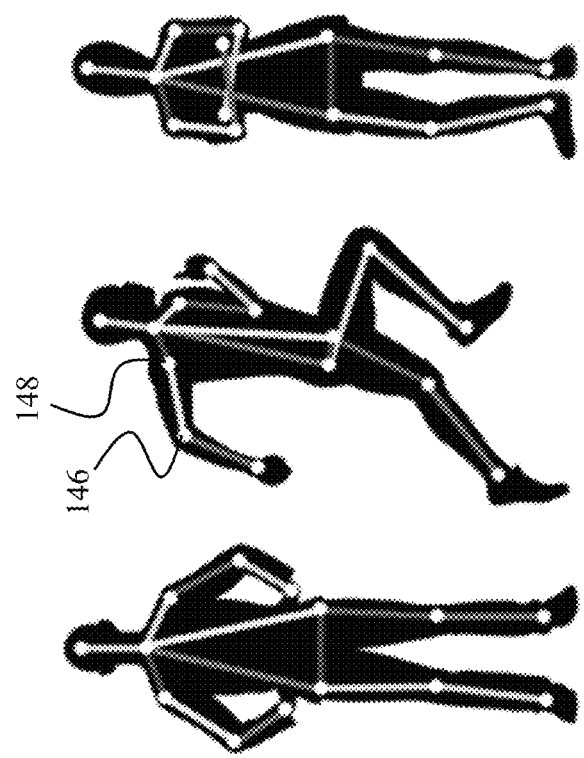
FIG. 1C shows a set of input images of a human body, according to some embodiments.

FIG. 1C shows a set of input images of a human body, according to some embodiments. In this case, the structured set of landmarks defines specific joints 146 and 148 of the human body. In one embodiment, the images are independent from each other. In a different embodiment, the set of input images is a temporal sequence of images of the human body. In another embodiment, the set contains a single image.

The controller 100 includes a memory 106 that stores instructions executable by a processor 104. The processor 104 may be configured to execute the stored instructions. The processor 104 may be a single core processor, a multi-core processor, a graphics processing unit (GPU), a computing cluster, or any number of other configurations. The memory 106 may include random access memory (RAM), read only memory (ROM), flash memory, or any other suitable memory systems. The processor 104 is connected through the bus 116 to one or more input and output devices. Further, the controller 100 includes a storage device 110 configured to store a neural network 112 and other components such as a probabilistic landmark estimator 114 and a task executor 136. The storage device 110 may be implemented using a hard drive, an optical drive, a thumb drive, an array of drives, or any combinations thereof. In some embodiments, the neural network 112 was trained to process images of objects of the type having the structured set of landmarks to produce a parametric probability distribution defined by values of parameters for a location of each landmark in each processed image. In the case in which the type of object is the human face, the neural network 112 is trained to process images of different faces, such as the human face images shown in FIG. 1B. In the case in which the object is the human body, the neural network is trained to process images of different human bodies, such as the human body images shown in FIG. 1C.

The processor 104 is configured to submit the set of input images to the neural network 112 to produce the values of the parameters that define the parametric probability distribution over the location of each landmark in the structured set of landmarks of each input image. The parametric probability distribution for each landmark includes an estimate of the location of the landmark, such that the location of the landmark and an uncertainty of the location estimation for the landmark are derived from parameters of the parametric probability distribution. In some embodiments, the parametric probability distribution of the landmark is a Gaussian probability distribution, and the estimated location of the landmark is the mean of the Gaussian probability distribution. The uncertainty of location estimation is determined from a covariance matrix of the Gaussian probability distribution. The mean of the Gaussian probability distribution is obtained from one or more heatmaps, and the parameters that determine the covariance matrix are obtained by direct regression. To that end, some embodiments are based on a realization that the neural network 112 is further trained to provide a mapping from the input images to the Gaussian probability distributions that maximizes a likelihood of groundtruth landmark locations. In some embodiments, the groundtruth landmark locations refer to actual or accurate locations of landmarks. In some embodiments, the groundtruth landmark locations refer to locations of landmarks that were indicated by human labellers.

The processor 104 executes the probabilistic landmark estimator 114 to determine, using the neural network 112, the parametric probability distribution over the location of each landmark and to determine, for each input image, a global landmark uncertainty for the image based on the parametric probability distributions of landmarks in the input image. For example, in some implementations, the determined uncertainties of estimation of landmarks in the input image are combined to produce the global landmark uncertainty for the input image. Further, the processor 104 is configured to run the task executor 136 to execute the task based on the global landmark uncertainty of each input image.

In some embodiments, the execution of the task, by the processor 104, is based on the estimation of the locations of the landmarks in each image and the global landmark uncertainty of each input image. In some embodiments, threshold values of the task executor may be predefined. In some embodiments, the threshold values are exclusive to the task, which implies that the threshold values may vary from one task to the other. The task execution involves taking a primary course of action if the global landmark uncertainty for the input image is below a threshold, and taking a secondary course of action if the global landmark uncertainty for the input image is above a threshold.

In some implementations, the controller 100 includes a display interface 124 adapted to connect the controller 100 to a display device 126, wherein the display device 126 may include a computer monitor, television, projector, or mobile display device, among others. Additionally, or alternatively, the controller 100 can include an imaging interface 128 adapted to connect the controller 100 to an imaging device 130. The imaging device 130 may include a video camera, computer, mobile device, webcam, or any combination thereof.

Additionally, or alternatively, in some embodiments, the controller 100 is connected to an application interface 132 through the bus 116 adapted to connect the controller 100 to an application device 134 that can operate based on results of controller 100. For example, in one embodiment, the application device 134 is a car navigation system that uses the estimated landmark locations to obtain vital signs of a driver and global landmark uncertainty to validate whether the estimated landmark locations, and thus the obtained vital signs, can be trusted, and execute a task that includes deciding how to control, e.g., steer, the car. For instance, in one embodiment, the application device 134 is a driver monitoring system, which uses landmark localization with uncertainty to determine and validate the vital signs of the driver to determine when the driver is able to drive safely, e.g., whether the driver is drowsy or not, or whether the driver is incapacitated.

Figure 2:
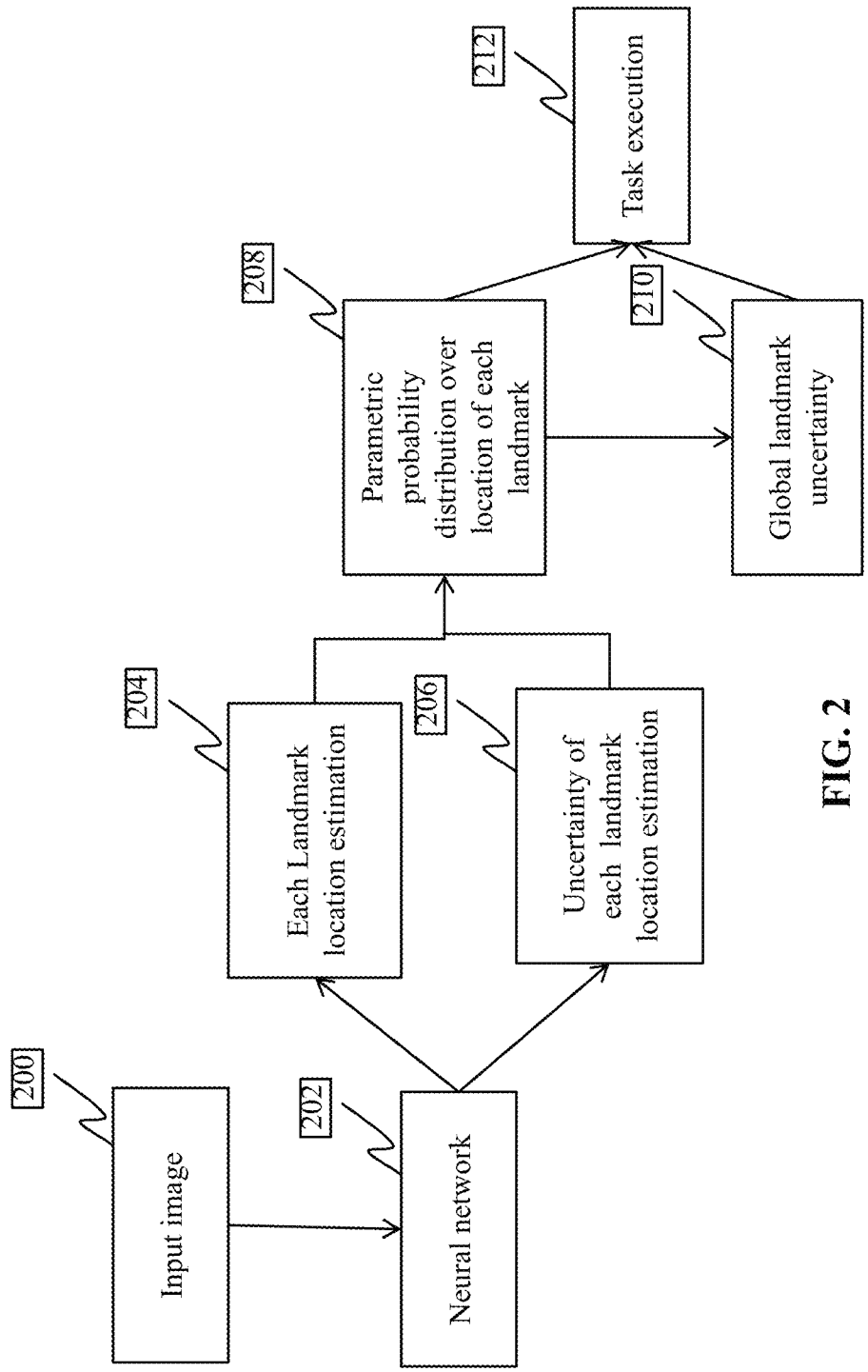
FIG. 2 shows a schematic overview of principles of the controller for executing the task based on probabilistic image-based landmark localization, according to some embodiments.

FIG. 2 shows a schematic overview of principles of the controller for executing the task based on probabilistic image-based landmark localization, according to some embodiments. An input image 200 having a structured set of landmarks is input to a neural network 202. The input image 200 may include objects, such as a human face and/or human body. In some embodiments, a set of input images, such as a sequence of video frames, may be input to the neural network 202. The neural network 202 outputs an estimate of each landmark location 204 and an estimated uncertainty of each landmark location 206, such as the shape and scale of a probabilistic distribution. The output parameters, i.e., the estimation of each landmark location 204 and the uncertainty of each landmark location 206, define a parametric probability distribution over location of each landmark 208.

In some embodiments, the parametric probability distribution over the location of each landmark 208 is a 2D Gaussian distribution. For a 2D input image, the Gaussian distribution is defined by a mean, which is a 2D vector defining a location in image space, and a 2×2 covariance matrix, which is a positive definite (or at least positive semidefinite) matrix whose diagonal elements are positive or at least non-negative. In such embodiments, the mean of the Gaussian distribution may be used as a point estimate of the location of each landmark. In some other embodiments, median location (computed separately in x and y directions), or the location at which the probability distribution reaches its maximum value may be used as a point estimate of the location of each landmark. The covariance matrix may be used to determine the uncertainty of each landmark location.

Additionally, or alternatively, in some embodiments the estimated probability distribution over each landmark's location may be parameterized in such a way that there is not a single point estimate of the location of the landmark. For example, the probabilistic distribution over each landmark's location could be a mixture of two Gaussians, which would be parameterized by two means and two covariance matrices.

For the input image 200, based on the parametric probability distribution over location of every landmark 208 in the input image 200, a global landmark uncertainty 210 is determined. The global landmark uncertainty 210 may be a single scalar measure that summarizes the uncertainties of all of the individual landmarks' estimated locations in the input image 200. Based on the global landmark uncertainty 210 a task execution 212 is carried out. In some embodiments, the task execution is based on both the parametric probability distribution over location of each landmark 208 and the global landmark uncertainty 210. Additionally, or alternatively, in some embodiments, the task execution is based on the estimated location of each landmark 204 and the global landmark uncertainty.

In some embodiments, for each input image, the controller 100 may compare the determined global landmark uncertainty with threshold values. The threshold values may be predefined. If an input image's global landmark uncertainty is less than a threshold value, then the controller 100 executes a primary course of action. If, however, an input image's global landmark uncertainty is greater than the threshold value, then the controller 100 executes a secondary course of action, which may be different from the primary course of action.

Additionally, or alternatively, in some embodiments, global landmark uncertainty may be computed for a subset of the landmarks. For example, if the object is a face, then global landmark uncertainty may be computed based on the uncertainty of the locations of the landmarks that determine the location of the eyes. This could be advantageous, for example, for applications that rely on knowing accurate locations of the eyes, e.g., in order to perform subsequent gaze direction estimation.

Figure 3:
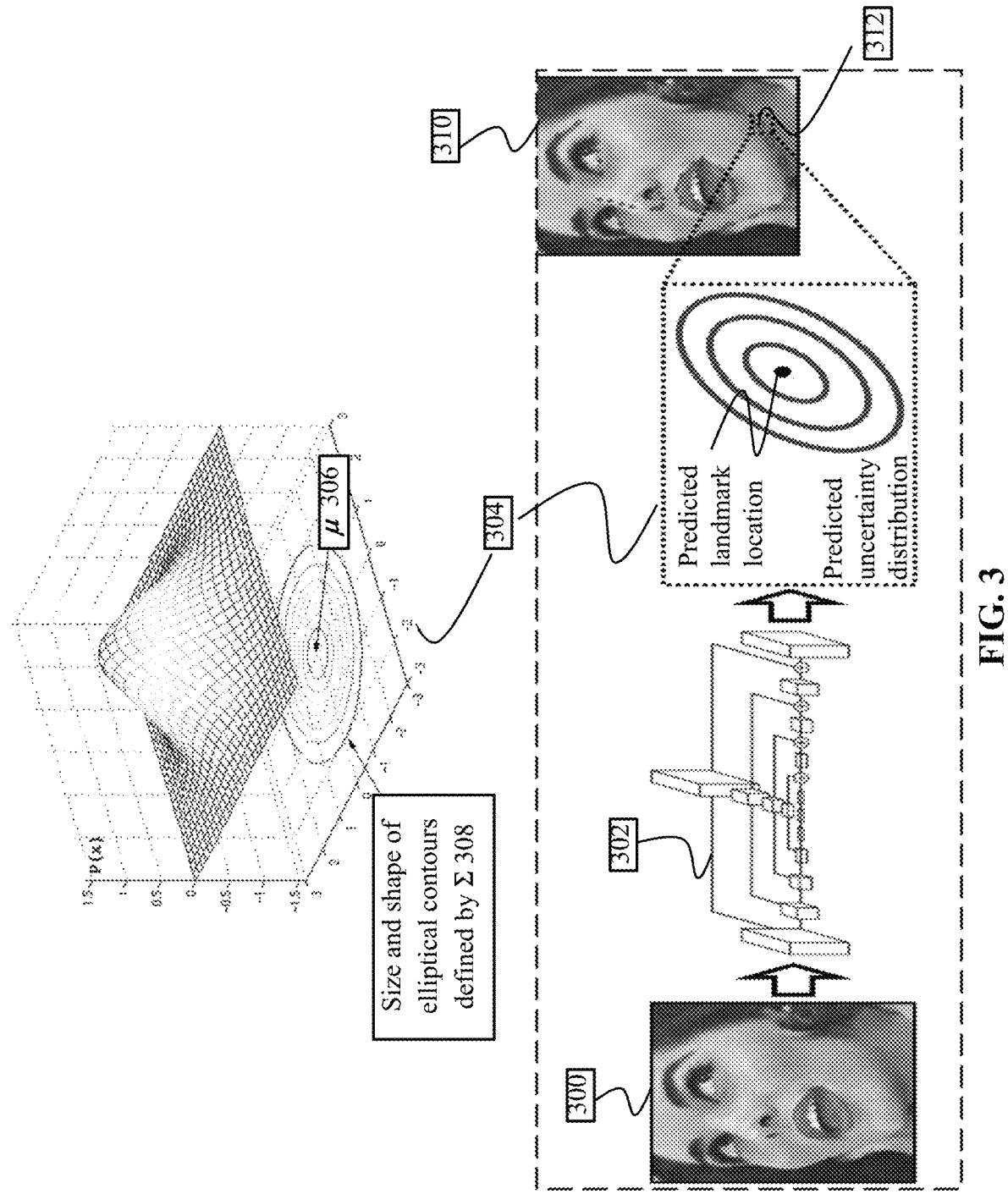
FIG. 3 shows schematic illustrating principles of probabilistic neural networks used by some embodiments.

FIG. 3 shows schematic illustrating principles of a probabilistic neural network used by some embodiments. The neural network 302 processes an input image 300 to output the parametric probability distribution 304 defined by values of parameters for a location of each landmark in each processed image. In case when the probabilistic distribution 304 is Gaussian, the parameters of such distribution include a mean, µ 306, and a covariance matrix, Σ 308. Because the image is multidimensional (e.g., two-dimensional), the parameters of the parametric probability distribution 304 are multidimensional as well.

Different parameters of the parametric probability distribution 304 for each landmark define 310 a point estimate of the location of the landmark and an uncertainty of the location estimation for each landmark. For example, as illustrated in FIG. 3, a center of the ellipse 312 indicates the estimated location of the landmark, while the size and shape of the ellipse 312 indicate the degree of uncertainty in each direction. For example, the larger the oval, the greater the uncertainty. In the case of a Gaussian probability distribution, the oval may represent an equiprobable contour of the parametric probability distribution.

The neural network 302 can be trained using backpropagation following a gradient-based optimization algorithm that exploits the chain rule. The main feature of backpropagation is its iterative, recursive, and efficient method for calculating the weights' updates to improve the network until it is able to perform the task for which it is being trained. However, different embodiments vary among structure of layers of the neural network, loss function, and optimization technique to improve the accuracy of landmark localization.

Figure 4A:
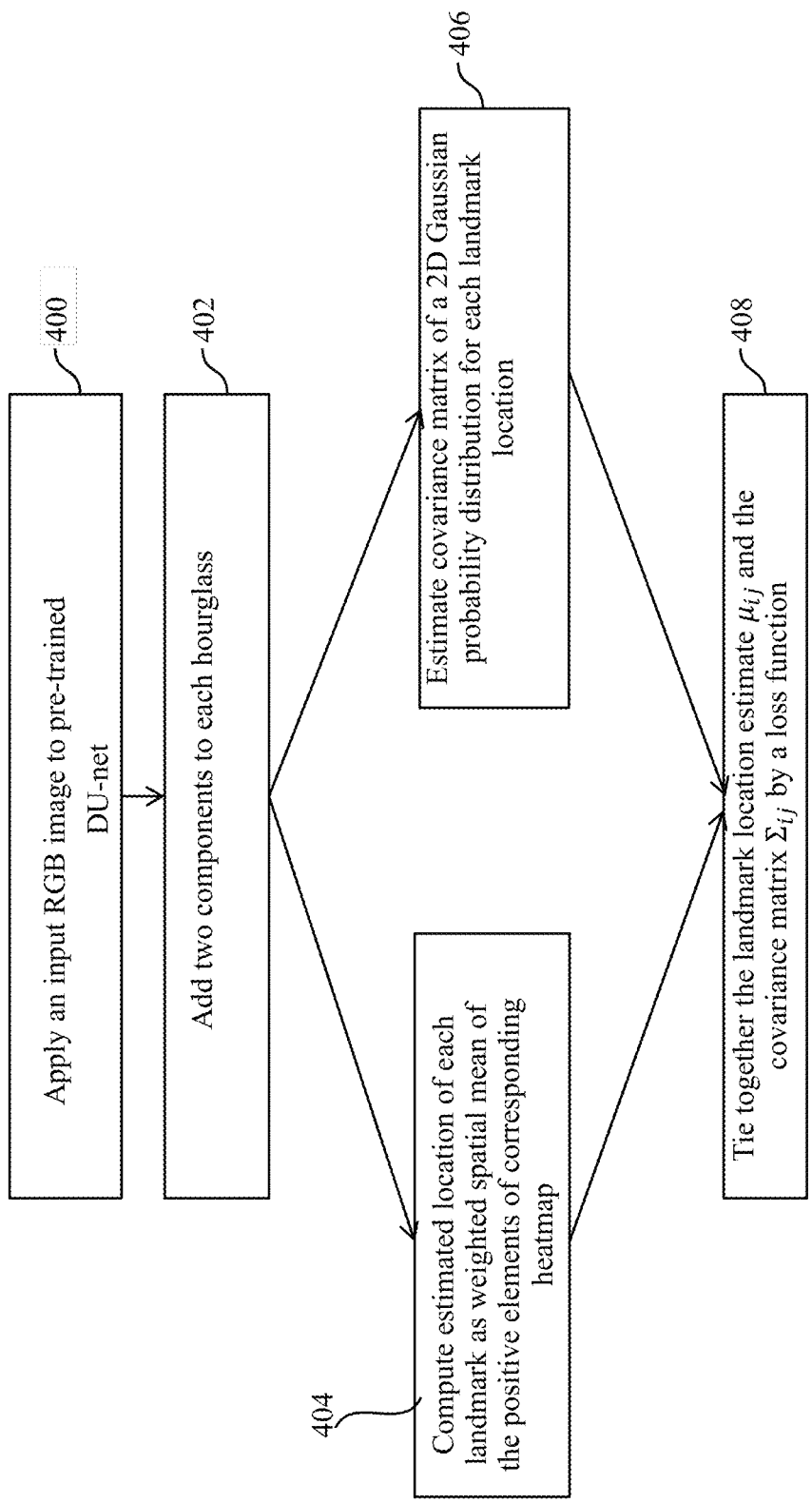
FIG. 4A shows a schematic of training a neural network for estimation of landmark location and uncertainty of location estimation, according to some embodiments.

FIG. 4A shows a schematic of training a neural network for estimation of landmark location and uncertainty of location estimation, according to some embodiments. Since the estimation of landmark location is carried out on human face images, it is referred to as face alignment. An input RGB image of the human face is applied to pre-trained densely connected U-nets (DU-Net) 400. Each U-net is referred to as an hourglass. To each hourglass, two components are added 402. The first component is utilized to compute estimated location of each landmark as a weighted spatial average (e.g., mean) of the positive elements of a heatmap corresponding to that landmark 404, where the value of the heatmap at each pixel location determines the weight applied to that pixel location in the spatial average. The second component is utilized to estimate a covariance matrix of a 2D Gaussian probability distribution for each landmark location 406. The second component emerges from a bottleneck layer of each hourglass. For each hourglass i and each landmark j, the landmark location estimate is given by $\mu_{ij}$ and covariance matrix is given by $\Sigma_{ij}$. Further, the landmark location estimate $\mu_{ij}$ and the covariance matrix $\Sigma_{ij}$ are tied together by a loss function 408 that enables end-to-end optimization of the entire face alignment and uncertainty estimation system.

In some embodiments, the method of training the neural network is an Uncertainty with Gaussian Log-Likelihood Loss (UGLLI) method, which is a neural network-based method. In some embodiments, the UGLLI method is also referred to as UGLLI model. The UGLLI method yields more accurate results. This is explained in detail in description with reference to FIGS. 6A through 8. In some embodiments, UGLLI is utilized to obtain, for each image, the parametric probability distribution over the location of each landmark and the global landmark uncertainty. In such embodiments, the two components are mean estimator and Cholesky Estimator Network (CEN). The mean estimator corresponds to the first component and the Cholesky estimator network corresponds to the second component. In some other embodiments, the loss function that is utilized to tie together the landmark location estimate $\mu_{ij}$ and the covariance matrix $\Sigma_{ij}$ is a Gaussian log-likelihood (GLL) loss function $L_{ij}$. Unlike a non-parametric kernel density network model, the uncertainty estimation method disclosed here is parametric, i.e., parameters of a single Gaussian distribution estimated directly. Furthermore, some embodiments are based on a realization that the Gaussian covariance matrix is not constrained to be diagonal. In some embodiments, other parametric models can be used to estimate the probability distribution for each landmark in an image, such as a Laplacian distribution, a multivariate exponential distribution, or a probabilistic mixture of a small number of 2D multivariate Gaussians (mixture of Gaussians). Further, in some embodiments, the UGLLI method is utilized for landmark localization problems such as face alignment, body pose estimation, and the like.

Figure 4B:
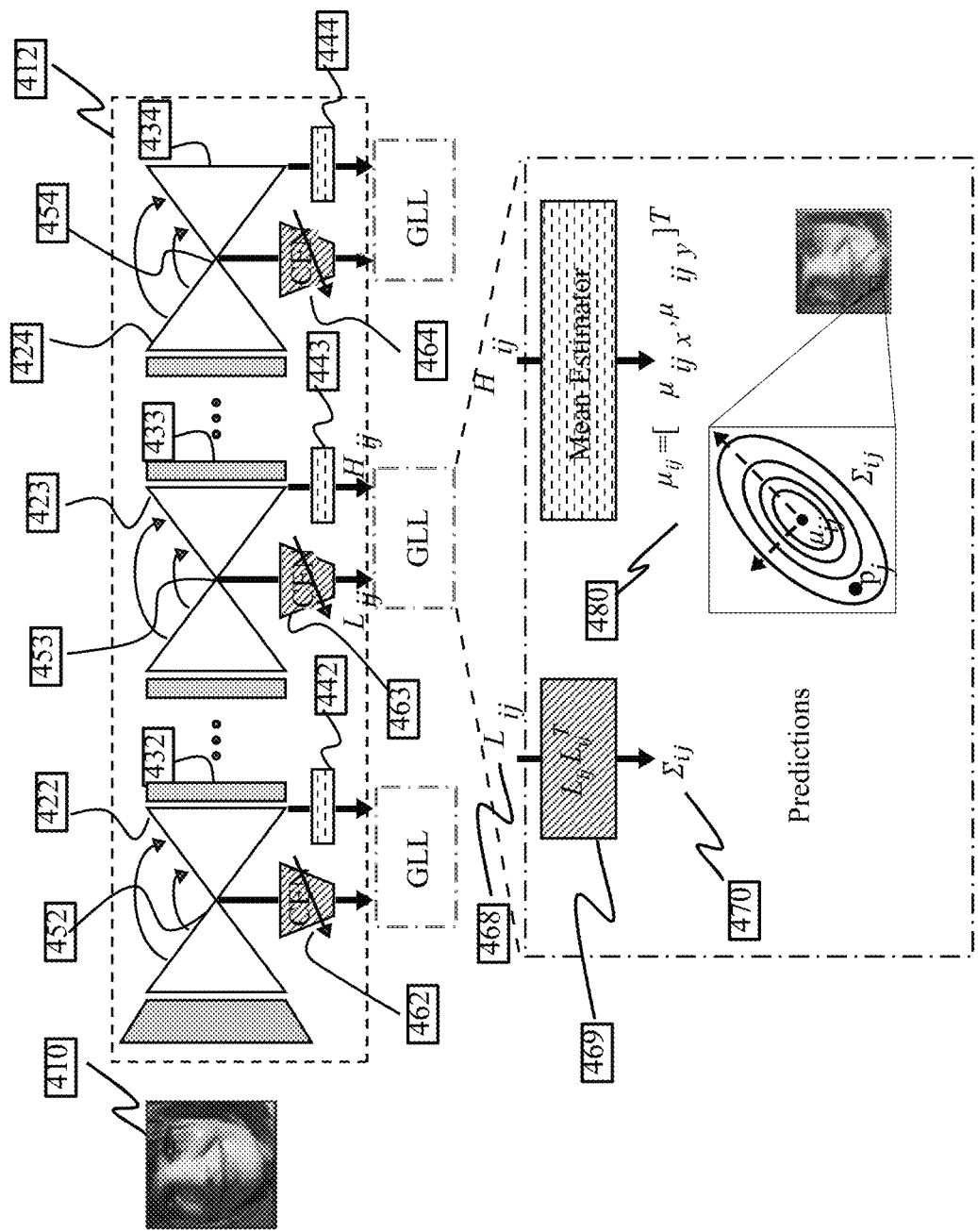
FIG. 4B shows schema of an Uncertainty with Gaussian Log-Likelihood Loss (UGLLI) method for obtaining, for each input image, a parametric probability distribution over a location of each landmark, according to some embodiments.

FIG. 4B shows the UGLLI method for obtaining, for each input image, the parametric probability distribution over the location of each landmark, according to some embodiments. An input RGB image 410 of a human face is into to a pre-trained neural network whose architecture is densely connected U-nets (DU-Net) 412. Each U-net is referred to as an hourglass. In other embodiments, the neural network architecture is a cascade (i.e., sequence) of hourglass networks, known as stacked hourglasses. The UGLLI method uses heatmaps $H_{ij}$ Hit 442, 443, and 444 for estimating each landmark's location, which is the mean $\mu_{ij}$ 480 of the Gaussian parametric probability distribution, but not for estimating the uncertainty of each landmark location, represented by the covariance matrix $\Sigma_{ij}$ 470 of the Gaussian parametric probability distribution.

In existing heatmap-based methods for landmark regression (e.g., face alignment and body pose estimation), each estimated landmark location is obtained by taking the argmax of the corresponding heatmap (the pixel location at which the heatmap achieves its maximum value). However, the argmax is non-differentiable (and thus the existing networks for landmark regression cannot be trained in an end-to-end fashion, which often yields superior results), and landmark locations are quantized because they are restricted to lattice points of the heatmap's underlying grid, yielding suboptimal accuracy of the estimation of landmarks' locations. Therefore, rather than the argmax of the heatmap, the UGLLI method utilizes the mean estimator for the heatmap, because the mean function is differentiable and enables sub-pixel accuracy. In some embodiments, a function σ is applied to the heatmap before computation of the mean. In some embodiments, the function σ is a rectified linear unit (ReLU) function, σ(X)=max(X, 0), which restricts the mean to be taken over only the positive elements of the heatmap, ignoring negative elements of the heatmap. Alternatively or additionally, in some embodiments, a different differentiable or sub differentiable function σ may be applied prior to taking the mean. For example, σ may be a softmax function or a temperature-controlled softmax function, which can be used to focus the mean primarily on the locations where the heatmap takes on its largest values.

For example, in one implementation, the neural network includes a stack 412 of hourglass subnetworks 422, 423, and 424. Each hourglass outputs a heatmap $H_{ij}$ 442, 443, and 444 for each landmark from last, largest feature map layer 432, 433, and 434 of the hourglass. A heatmap is an intensity image indicative of the location of the landmark, and the mean 442, 443, and 444 of the parametric probability distribution for the corresponding landmark is obtained using a weighted mean of the locations of the positive values of the heatmap. In addition, the hourglass subnetworks 422, 423, and 424 have a second output from a bottleneck, smallest feature layer 452, 453, and 454. The feature values of the bottleneck layer are processed by a sub-network called a Cholesky estimator network (CEN) 462, 463, and 464 to produce a lower-triangular matrix $L_{ij}$ 468, where a covariance matrix $\Sigma_{ij}$ 470 of the parametric probability distribution for each landmark is obtained from the product of $L_{ij}$ and its transpose 469.

For instance, consider $H_{ij}$ (x, y) which denotes the heatmap value at pixel location (x, y) of the jth landmark's heatmap from the ith hourglass. The landmark's location estimate $\mu_{ij}=[\mu_{ijx}, \mu_{ijy}]^T$ 480 is given by post-processing pixels of the heatmap $H_{ij}$ with the function σ and subsequently taking the weighted spatial mean of the result of the post-processing. Various functions are considered for the function σ, such as Rectified Linear Unit (ReLU) function, softmax function, a temperature controlled softmax function, and the like. The ReLU function eliminates negative values of the heatmap. The softmax function modifies the mean estimator to be a soft version of the argmax of the heatmap. The temperature-controlled softmax function, depending on the temperature setting, provides a continuum of softmax functions that range from a hard argmax to the uniform distribution. In some embodiments, it is observed that selecting the function σ to be the ReLU function yields a simplest and accurate mean estimator. Estimating the landmark location from positive heatmap by taking the spatial mean can be considered as the maximum likelihood estimate (MLE) of the mean of a 2D Gaussian distribution. The mean of the 2D Gaussian distribution is sampled on a regular grid, where the heatmap values represent frequency of samples at each grid location.

Some embodiments are based on a realization that computing a covariance matrix directly from the heatmap yields inaccurate results, as many images contain some landmarks that can be located very accurately, and the uncertainty of these landmarks' locations is very small (a fraction of a pixel) in at least one direction. The uncertainty of each landmark location is represented as the Gaussian distribution with the covariance matrix $\Sigma_{ij}$ 470, a 2×2 symmetric positive definite matrix. The covariance matrix $\Sigma_{ij}$ 470 has three degrees of freedom that are captured by its Cholesky decomposition, i.e., a lower-triangular matrix $L_{ij}$ 468 such that $\Sigma_{ij} = L_{ij} L_{ij}^T$ 469, where $L_{ij}^T$ indicates the transpose of $L_{ij}$.

To estimate the lower-triangular matrix $L_{ij}$ 468, the Cholesky Estimator Network (CEN) is added from the bottleneck of each hourglass. The CEN is a fully connected linear layer whose input is the bottleneck of the hourglass, which may have, e.g., 128×4×4=2048 dimensions, and whose output is a vector of $N_p \times 3$ dimensions, where $N_p$ is the number of landmarks in the structured set of landmarks. For example, if the number of landmarks is 68, then the output of the CEN has 68×3=224 dimensions. The lower-triangular matrix $L_{ij}$ is the Cholesky decomposition of a covariance matrix if it includes positive diagonal elements. To ensure that the lower-triangular matrix $L_{ij}$ 468 includes positive diagonal elements, an Exponential Linear Unit (ELU) activation function is applied to the first and third elements of the lower-triangular matrix $L_{ij}$. In some embodiments, the ELU function with a constant is utilized to ensure that the lower-triangular matrix $L_{ij}$ includes positive diagonal elements.

Given the estimated Gaussian distribution for a landmark of an input image at each hourglass i, the likelihood that the landmark j is at image location $p_j$ is given by:

$$P(p_j | \mu_{ij}, L_{ij}) = \frac{\exp\left(-\frac{1}{2}(p_j - \mu_{ij})^T \Sigma_{ij}^{-1} (p_j - \mu_{ij})\right)}{2\pi \sqrt{|\Sigma_{ij}|}} \quad (1)$$

where $\Sigma_{ij} = L_{ij} L_{ij}^T$, the determinant of the matrix $\Sigma_{ij}$ is denoted $|\Sigma_{ij}|$, and $\mu_{ij}$ is the landmark's estimated location.

Thus, for each landmark in every input image, the neural network outputs a Gaussian distribution that is parameterized by $\mu_{ij}$ and $L_{ij}$.

The neural network is trained to provide a mapping from input images to Gaussian distributions, such that the likelihood of the groundtruth landmark locations (over all landmarks and all training images) is as large as possible. Maximizing the likelihood (1) is equivalent to minimizing negative log likelihood. Therefore, the negative log likelihood is utilized as the loss function. The loss function $L_{ij}$ at each hourglass i for the landmark j can be written as the sum of two terms, $T_1$ and $T_2$:

$$\mathcal{L}_{ij} = \underbrace{\log|\Sigma_{ij}|}_{T_1} + \underbrace{(p_j - \mu_{ij})^T \Sigma_{ij}^{-1} (p_j - \mu_{ij})}_{T_2} \quad (2)$$

where $T_1$ serves as a regularization term that ensures that the Gaussian uncertainty distribution does not get too large, and $T_2$ is the squared Mahalanobis distance of the groundtruth landmark location $p_j$. In some embodiments, the groundtruth landmark location $p_j$ in a training image is the location where a human expert labeller indicated that landmark j is located in the training image. If the covariance matrix $\Sigma_{ij}$ is an identity matrix, then eqn. (2) reduces to standard $\ell_2$ distance (i.e., Euclidean distance) between the estimated landmark location $\mu_{ij}$ and the groundtruth landmark location $p_j$.

The objective function for a single hourglass is obtained by averaging the losses across all the landmarks $(1, \ldots, N_p)$, and the total loss L for each input image is a weighted sum of the losses of every hourglass i, given by $$\mathcal{L} = \sum_{i=1}^{K} \lambda_i \mathcal{L}_i, \quad (3)$$

$$\text{where } \mathcal{L}_i = \frac{1}{N_p} \sum_{j=1}^{N_p} \mathcal{L}_{ij}.$$

In some embodiments, at test time, each landmark's estimated mean and covariance matrix are derived only from the final hourglass K 424.

Figure 5:
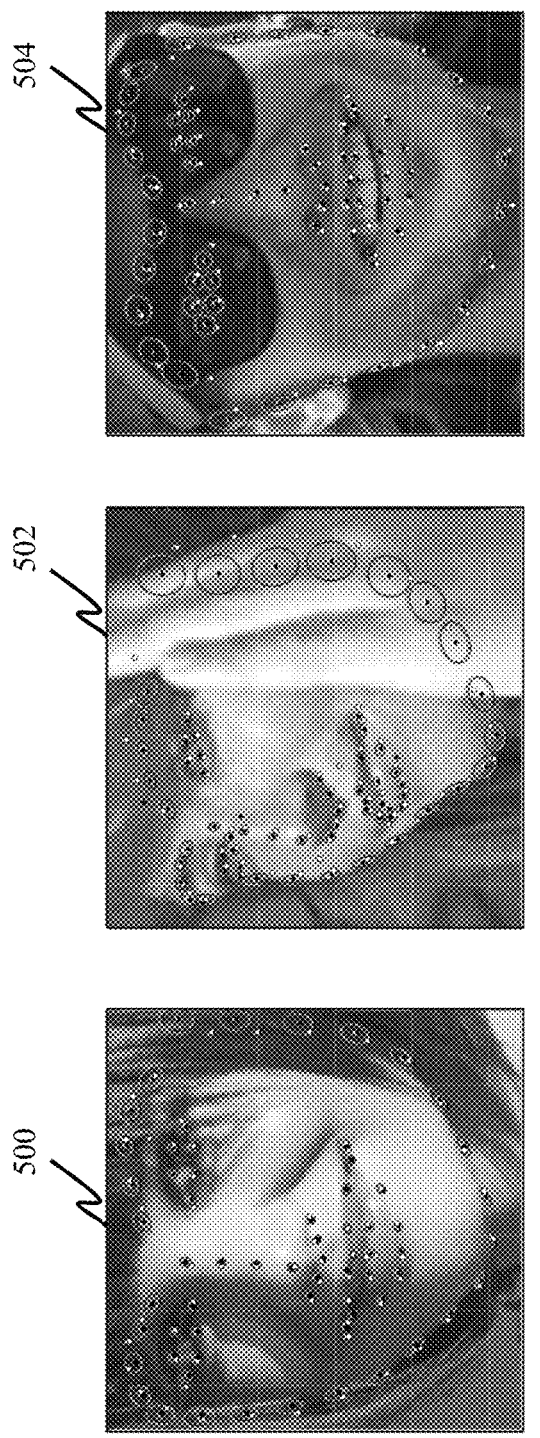
FIG. 5 shows exemplary results of the landmark location estimation and the uncertainty of the location estimation on test images.

FIG. 5 shows exemplary results of the landmark location estimation and the uncertainty of the location estimation on test images. In images 500, 502, and 504, white dots represent the groundtruth landmark locations and black dots represent the estimated landmark locations. The ellipses represents the estimated uncertainty of the estimated locations of landmarks, i.e., the contour of locations $p_j$ that have Mahalanobis distance equal to 1 based on the estimated mean and covariance matrix parameters that define the Gaussian probability distribution for landmark j. Larger ellipses (such as the ellipses on the hand in image 502) represent larger uncertainty, and similarly, smaller ellipses (e.g., the ellipses on the nose in image 500) represent smaller uncertainty. It is observed that the landmarks that are occluded (e.g., by the hand in image 502) tend to have larger uncertainty, indicating that the estimation of uncertainty of landmark locations correctly determines that the estimated locations of occluded landmarks are less certain.

FIG. 6A is a table of normalized mean error (NME) comparison between different methods on 300-W Common, Challenge, and Full datasets (Split 1). The face alignment results or landmark location estimation for training/test set pair which is referred to as 300-W Split 1 is summarized in the table of FIG. 5 and reported as the NME averaged across the images in the test set, on the 300W common subset, challenge subset, and full dataset. From the results in the table of FIG. 5, it is observed that the UGLLI method, which is disclosed herein, outperforms some other recent methods for face alignment. In addition to yielding the most accurate point estimate of landmark location (the mean of the Gaussian parametric probability distribution output by the UGLLI method), the UGLLI method provides an estimate of the uncertainty of each estimated landmark location, in the form of the covariance matrix of the Gaussian parametric probability distribution. None of the other methods in FIG. 6A provide an estimate of the uncertainty of their landmark location estimation.

FIG. 6B is a table of the normalized mean error (NME) and Area Under the Curve AUC comparison between different methods on the 300-W Test (Split 2) and Menpo datasets. The face alignment results or landmark location estimation for training/test set pair which is referred to as 300-W Split 2 is summarized in the table of FIG. 5. Further, the table of FIG. 6B shows the results of a model (trained on Split 2) on the Menpo dataset (6679 frontal training images with 68 landmarks). From the results in the FIG. 6B, it is evident that the UGLLI method significantly outperforms other methods.

A scalar quantity that measures the uncertainty of location estimation for each landmark in the image is determined.

Further, the values of this uncertainty of location estimation for all landmarks in the image are combined to obtain a single scalar global landmark uncertainty value for the entire image. In some embodiments, the uncertainty of location estimation for each landmark is obtained from the covariance matrix of the Gaussian probability distribution over the location of the landmark.

For example, the uncertainty of location estimation for the landmark could be an average of eigenvalues of the covariance matrix. In some embodiments, an $n^{th}$ root of the determinant of the covariance matrix, such as a square-root or a fourth-root of the determinant, is used as the uncertainty of location estimation for the landmark. In an embodiment, the fourth root of the determinant of the covariance matrix estimated from the final hourglass, K, is used as the scalar uncertainty of location estimation for each landmark, i.e., $|93_{Kj}|^{1/4}$.

Figure 7:
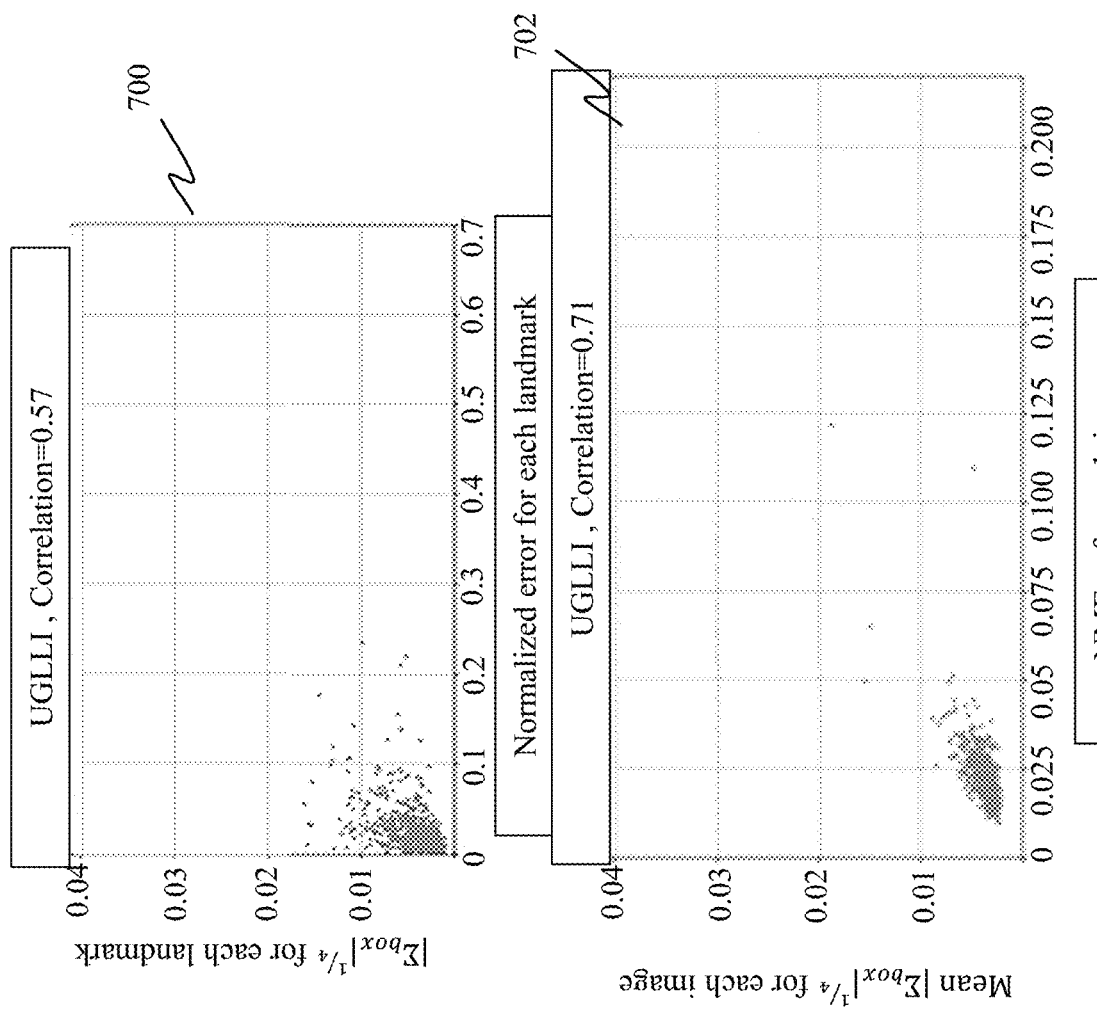
FIG. 7 shows plots of the normalized uncertainty of location estimation vs the normalized error of the point estimate of landmark location on all 300-W Test images (Split 2).

FIG. 7 shows plots of the normalized uncertainty of location estimation versus the normalized error of the point estimate of landmark location on all 300-W Test images (Split 2). In plot 700, each point represents one landmark in one image, and the y-coordinate of each point represents a normalized version of that landmark's uncertainty of location estimation. In plot 702, each point represents an average across all landmarks in one image, and the y-coordinate of each point represents the global landmark uncertainty for the image. Here, the global landmark uncertainty for an image is computed as the mean across all landmarks in the image of the normalized uncertainty of location estimation. The Pearson correlation coefficient for each plot, written at the top of each plot, shows that our predicted uncertainties are highly correlated with the actual errors.

It is observed that the correlation coefficient in the plot 702 is greater than the correlation coefficient of the plot 700. In other words, although the uncertainty of landmark location of each landmark in an image is a good predictor of the error of that landmark's estimated location, the global landmark uncertainty for the image is a better predictor (of the mean landmark localization error for the image). Further, the global landmark uncertainty for the image has significantly higher correlation coefficient. Therefore, in some embodiments, the global landmark uncertainty for the image is applied as input to a controller for a task execution, rather than using the uncertainty of landmark location for each individual landmark.

FIG. 8 is a table showing ablation studies on 300-W Test and Menpo datasets using the UGLLI method trained on 300-W Split 2. The table of FIG. 8 shows that computing the loss function only on the last hourglass (HG) during training leads to a network that performs less efficiently and less accurately than computing loss on all hourglasses during training, perhaps because it ameliorates the vanishing gradient problem. Moreover, the UGLLI method's Gaussian Log-Likelihood (GLL) loss outperforms using the Mean Square Error (MSE) loss on the landmark locations (equivalent to setting the estimated covariance matrix to be the identity matrix, $\Sigma_{ij}=I$). For the mean estimator, obtaining the mean using direct regression (Direct) from the bottleneck layer of each hourglass (rather than using the heatmap) is ineffective. This may be because neural networks can yield unreliable prediction of continuous real values. In addition to the ReLU function, two other functions for σ, i.e., soft-argmax (s-amax), and a temperature-scaled soft-argmax (τ-s-amax) are compared. Results for the temperature-scaled soft-argmax and the ReLU are essentially tied, but the temperature-scaled soft-argmax is more complicated and requires tuning the temperature parameter. Therefore, in some embodiments, the ReLU function is selected for the UGLLI method.

Figure 9A:
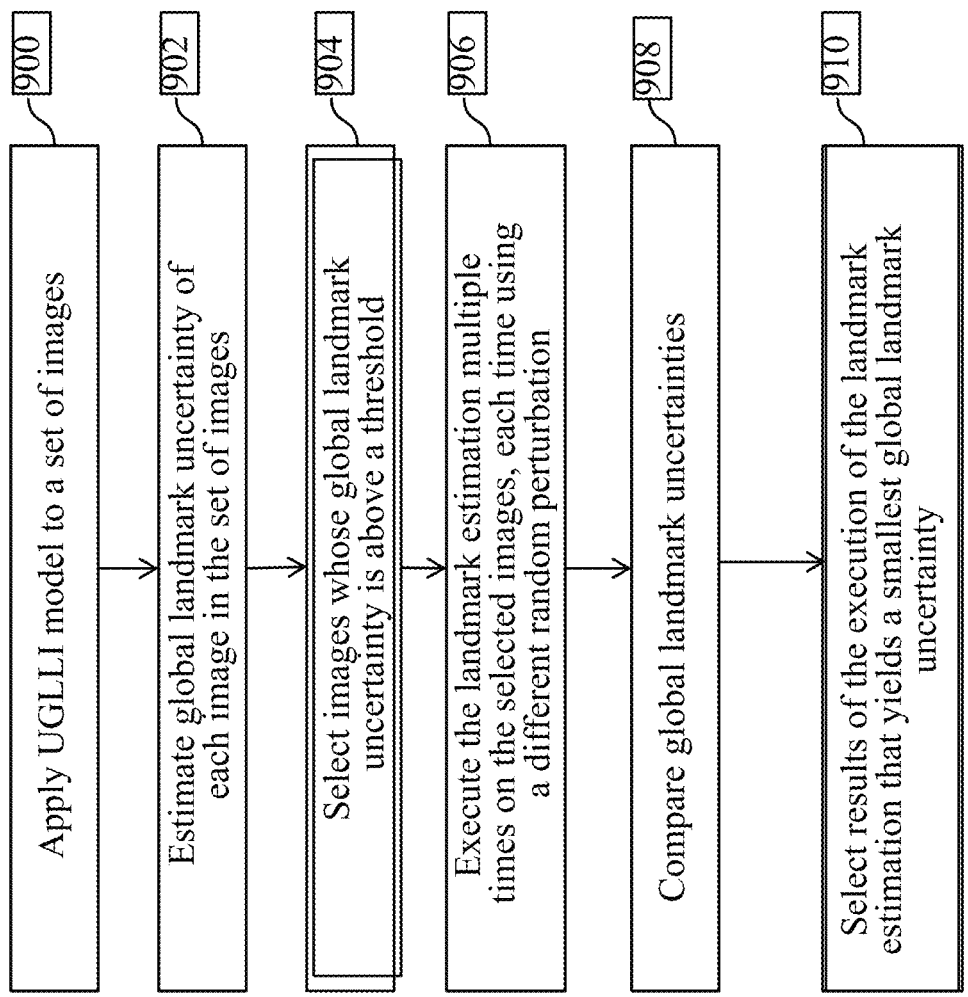
FIG. 9A shows a schematic for improving the landmark localization using uncertainty feedback, according to some embodiments.

FIG. 9A shows a schematic for improving landmark localization using uncertainty feedback, according to some embodiments. Apply the UGLLI model to a set of images 900. From the outputs of the UGLLI model, estimate the global landmark uncertainty of each image of the set of the images 902. From the estimated global landmark uncertainty of each image of the set of the images, select images whose global landmark uncertainty is above a threshold value 904. In some embodiments, the threshold value is predefined. The selected images (i.e., the images whose global landmark uncertainties are above the threshold) are the images for which the estimated landmark locations are estimated to be most uncertain, so these are the images for which the landmark localization is in most need of improvement. To improve the landmark estimates for the selected images, apply the UGLLI model multiple times to each selected image, each time using a different random perturbation 906. For example, in some embodiments, the random perturbation 906 is applied to the face box used to initialize the algorithm. The face box, which in some embodiments is determined by an automatic face detector such as the Viola-Jones face detection algorithm, is used to initially scale, translate, rotate, or otherwise transform the image of the object (e.g., via a 2D affine transformation) for input into the neural network. Applying random perturbations to one or more of the location, scale, rotation angle, and aspect ratio of the face box causes the initialization of the method to be slightly different, which also causes the outputs of the method to be slightly different. In particular, some initializations lead to estimated landmark locations that are more accurate.

For each selected image, the multiple perturbed versions of the image are fed through the UGLLI model, and the global landmark uncertainty of each perturbed version of the image is computed. Compare the global landmark uncertainties of all of the perturbed versions of the image 908, then select the results from a perturbation that yields a smallest global landmark uncertainty 910. It is observed that the landmark location estimates of these final results have smaller normalized mean error (NME) than the method's original landmark location estimates. In other words, therefore, due to uncertainty feedback, the average error of the landmark location estimation is reduced. Additionally, or alternatively, a different type of random perturbations may be applied. For instance, the feature values at certain layers of the neural network could be randomly perturbed.

Figure 9B:
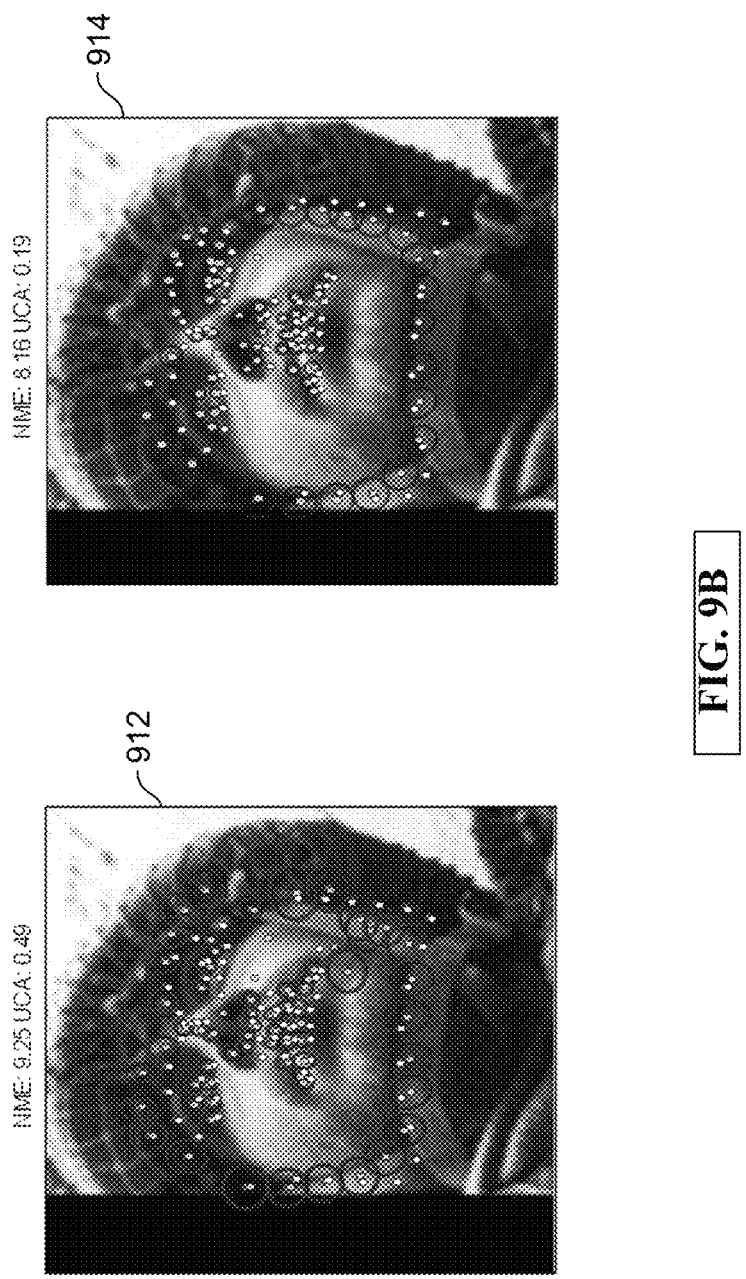
FIG. 9B shows exemplary results of the landmark location estimation and uncertainty of the landmark location estimation without the uncertainty feedback and with the uncertainty feedback.

FIG. 9B shows exemplary results of the landmark location estimation and uncertainty of the landmark location estimation without the uncertainty feedback and with the uncertainty feedback. In FIG. 9B, image 912 is the result of the landmark location estimation and uncertainty of the landmark location estimation without the uncertainty feedback. Image 914 is the result of the landmark location estimation and uncertainty of the landmark location estimation using the uncertainty feedback. The values of NME (%) as well as predicted uncertainty (UCA) averaged over the landmarks in each of the images 912 and 914 are shown on top of the images, respectively. From the results in FIG. 9B, it is evident that compared to the initial result i.e., the result without the uncertainty feedback 912, the result with the uncertainty feedback 914 has a smaller error.

Figure 10:
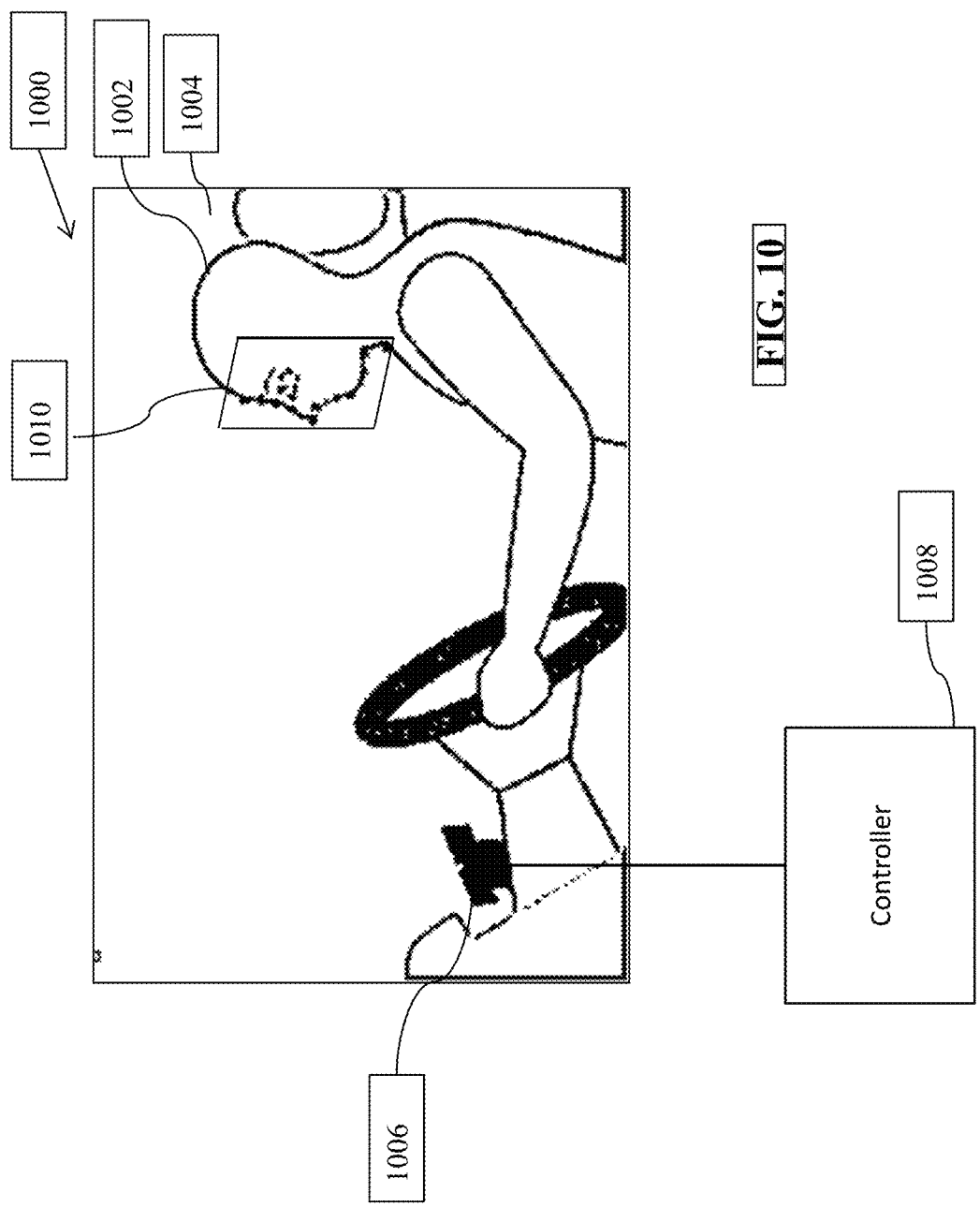
FIG. 10 shows as a schematic for executing a task, based on probabilistic image-based landmark localization, in a vehicle driver monitoring environment, according to some embodiments.

FIG. 10 shows a schematic for executing a task, based on probabilistic image-based landmark localization, in a vehicle driver monitoring environment, according to some embodiments. In the vehicle driver monitoring environment 1000, a vehicle driver 1002 is driving a vehicle 1004, and vital signs (one or more of face alignment and body pose alignment) of the vehicle driver 1002 need to be monitored. In some example embodiments, video tracking method is applied for face tracking or human pose tracking. In such cases, video-based landmark tracking can be a final task, or it can be an intermediate task whose results are used in a subsequent downstream task. Here, video face alignment (i.e., face tracking) is considered for the ease of describing embodiments. However, in some embodiments, other video tracking applications, including video human pose estimation (i.e., human pose tracking) are also considered.

A camera 1006 is configured to capture the video and convert the video captured into a temporal sequence of frames (i.e., images). A controller 1008 is configured to carry out probabilistic image-based landmark localization (e.g., the UGLLI method) on images in the temporal sequence of images. The image-based landmark localization is initialized by a facebox 1010 given by an automatic face detector, such as the Viola-Jones face detection algorithm. The facebox 1010 covers entire face of the vehicle driver 1002. In some embodiments, the facebox covers a significant part of the entire face of the vehicle driver 1002, e.g., the part of the face containing the landmarks.

For the first image in the sequence (the first frame of video), initialize the image-based landmark localization using a first face box given by the automatic face detector. The image-based landmark localization outputs landmarks estimation and global uncertainty estimation for the first image.

Based on the outputs, the controller 1008 determines a quality of the landmark localization and the task execution. In some embodiments, the controller 1008 determines that the quality of landmark localization in the first image is good if the estimated global landmark uncertainty of the first image is below a threshold and executes a primary course of action. In some embodiments, the primary course of action includes initializing the image-based landmark localization for a second image of the sequence using a second facebox determined by the estimated landmark locations from the first frame.

In some embodiments, the controller 1008 determines that the quality of landmark localization in the first image is poor if the estimated global landmark uncertainty of the first image is less than the threshold and executes a secondary course of action. In some embodiments, the secondary course of action includes initializing the image-based landmark localization for the second image using a second facebox given by the automatic face detector.

In some embodiments, the image-based landmark estimator is used for facial landmark tracking using a Bayes filter, such as a Kalman filter.

Figure 11:
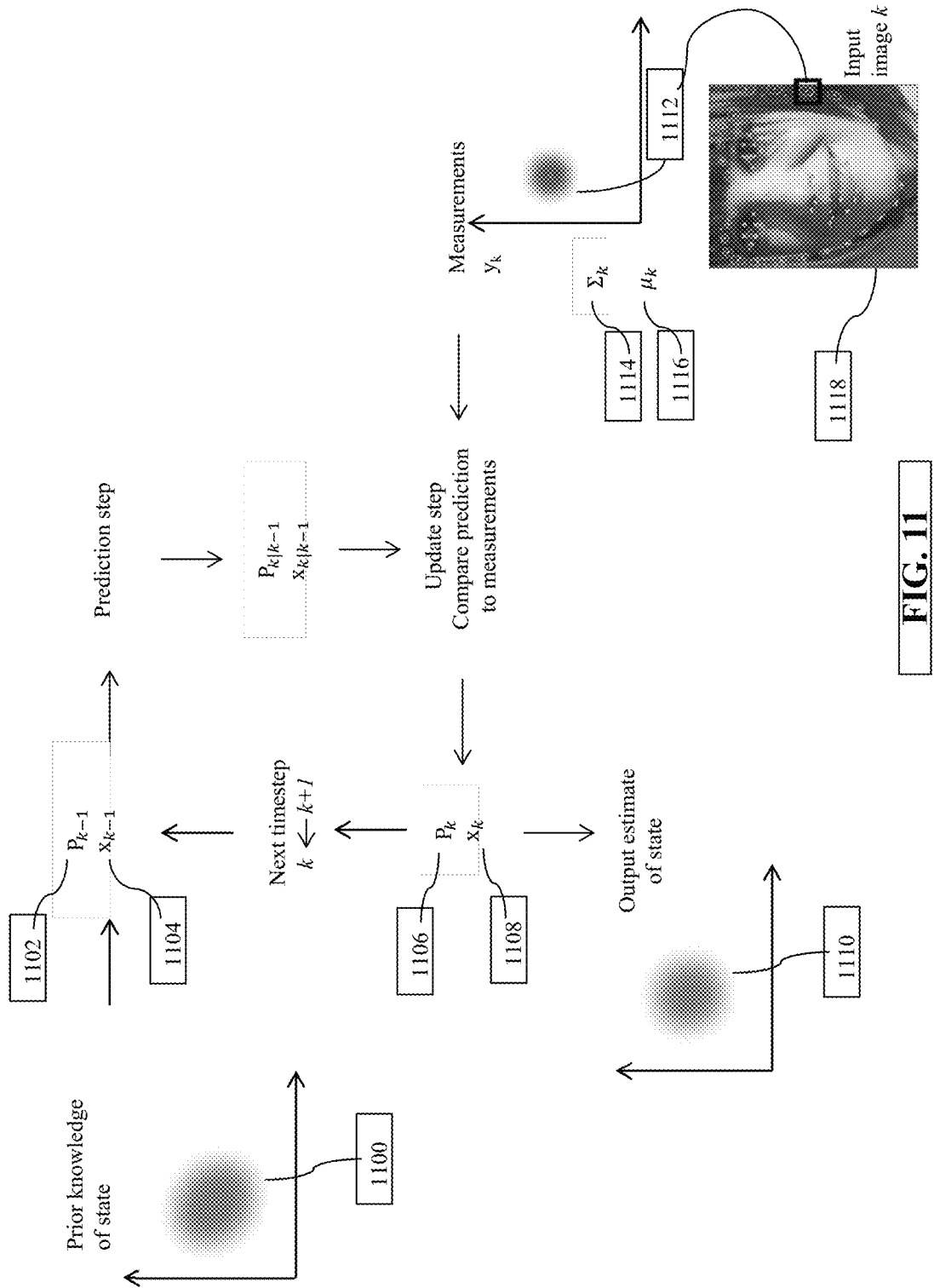
FIG. 11 shows a schematic for incorporating probabilistic image-based landmark localization into a Bayes filter, such as a Kalman filter, for video landmark tracking.

FIG. 11 shows a schematic of using a Bayes filter, such as a Kalman filter, in conjunction with image-based parametric probabilistic landmark localization, for probabilistic landmark tracking. In some embodiments, the image-based landmark localization, such as the UGLLI method, provides a Gaussian probability distribution 1112 for each landmark in each input image k 1118 in the image sequence. The Gaussian probability distribution 1112 for each landmark in each input image in the image sequence, which is parameterized by a mean $\mu_k$ 1116 and a covariance matrix $\Sigma_k$ 1114, is utilized as a noisy measurement which is obtained from the input image 1118. Further, the Gaussian probability distribution 1112 for each landmark over a sequence of time steps is combined using a Kalman filter to obtain a final Gaussian probability distribution 1110 over the location of the landmark in image k 1118. This Gaussian probability distribution 1110 is parameterized by a point estimate of the landmark location (i.e., the mean $x_k$ 1108, and an estimated uncertainty of the landmark location, which is the covariance matrix $P_k$ 1106. This probability distribution 1110 is referred to as the Gaussian distribution output by the Kalman filter for each image k in the image sequence. The output estimate 1110 by the Kalman filter for each image in the image sequence is used as the parametric probability distribution for the task execution by the controller.

In some embodiments, the controller is further configured to update the Gaussian probability distribution determined for a second image in the image sequence using the Gaussian probability distribution determined for a first image in the image sequence based on the Kalman filter. The output estimate 1110 by the Kalman filter for each input image (each timestep) is then used for a subsequent image (subsequent timestep) as the prior knowledge of state 1110 (i.e., the prior probability distribution), and the output mean 1108 and covariance matrix 1106 from each timestep are used in the subsequent timestep as the prior distribution 1100's mean 1104 and covariance matrix 1102. Using filtering over time, such as Kalman filtering, is advantageous for several reasons. First, it can improve accuracy of estimation of landmark location and uncertainties. Second, it can use the estimated uncertainty of each image appropriately, such that estimates 1112 with large uncertainty will affect the output landmark estimates 1110 less, whereas estimates 1112 with small uncertainty will affect the output landmark estimates 1110 more.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, if understood by one of ordinary skill in the art the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for executing a task based on probabilistic image-based landmark localization, comprising:
   an input interface configured to accept a set of input images of a type of object having a structured set of landmarks;
   a memory configured to store a neural network trained to process images of objects of the type having the structured set of landmarks to produce a parametric probability distribution defined by values of parameters over a location of each landmark in each processed image; and
   a processor configured to (1) submit the set of input images to the neural network to produce the values of the parameters that define the parametric probability distribution over the location of each landmark in the structured set of landmarks of each input image; (2) determine, for each input image, a global landmark uncertainty for the image based on the parametric probability distributions of landmarks in the input image; and (3) execute the task based on the parametric probability distributions of landmarks in each input image and the global landmark uncertainty of each input image.

2. The controller of claim 1, wherein different parameters of the parametric probability distribution for each landmark define a point estimate of the location of the landmark and an uncertainty of the location estimation for the landmark.

3. The controller of claim 2, wherein the processor executes the task based on the point estimates of the locations of the landmarks in each image and the global landmark uncertainty of each input image.

4. The controller of claim 1, wherein to determine accuracy of the landmark localization for each input image, the processor is configured to:
   determine an uncertainty of location estimation for each landmark in the input image based on a measure of uncertainty of the parametric probability distribution produced for the landmark; and
   combine, for each input image, the determined uncertainties of estimation of landmarks in the image to produce the global landmark uncertainty for the input image.

5. The controller of claim 1, wherein the type of object is a human face, the neural network is trained to process images of different faces, and the structured set of landmarks defines specific facial landmarks that are present on a typical face.

6. The controller of claim 5, wherein the set of input images is a temporal sequence of images of the human face.

7. The controller of claim 1, wherein the object is a human body, the neural network is trained to process images of different human bodies, and the structured set of landmarks defines specific joints of the human body.

8. The controller of claim 7, wherein the set of input images is a temporal sequence of images of the human body.

9. The controller of claim 2, wherein the parametric probability distribution of the landmark is a Gaussian probability distribution, wherein the point estimate of the location of the landmark is determined by the mean of the Gaussian probability distribution and the uncertainty of location estimation of the landmark is determined from a covariance matrix of the Gaussian probability distribution.

10. The controller of claim 9, wherein the mean of the Gaussian probability distribution is obtained from one or more heatmaps, and the parameters that determine the covariance matrix are obtained by direct regression.

11. The controller of claim 9, wherein the uncertainty of location estimation for the landmark is a nth root of a determinant of the covariance matrix of the Gaussian probability distribution.

12. The controller of claim 9, wherein the uncertainty of location estimation for the landmark is an average of eigenvalues of the covariance matrix of the Gaussian probability distribution.

13. The controller of claim 9, wherein the neural network includes a stack of hourglass subnetworks, wherein each hourglass outputs a heatmap for each landmark from a last, largest feature map layer of the hourglass, wherein a heatmap is an intensity image indicative of the location of the landmark, wherein the mean of the parametric probability distribution is a weighted mean of the locations of the locations of positive values of the heatmap, wherein each hourglass outputs features from a bottleneck layer, wherein the feature values of the bottleneck layer are processed by a Cholesky estimator network to produce values from which the covariance matrix of each landmark is derived.

14. The controller of claim 9, wherein the neural network is trained to provide a mapping from the input images to the Gaussian probability distributions that maximizes a likelihood of groundtruth landmark locations.

15. The controller of claim 14, wherein the neural network is trained using a negative log likelihood as a loss function.

16. The controller of claim 1, wherein the parametric probability distribution of a landmark for a current input image is a Gaussian probability distribution, and wherein the processor is configured to obtain a final Gaussian probability distribution over the location of the landmark in the image using a Kalman filter that updates the Gaussian probability distribution output by the Kalman filter for the current input image using a Gaussian probability distribution determined for a previous input image.

17. The controller of claim 1, wherein the task execution involves taking a primary course of action if the global landmark uncertainty for the input image is below a threshold, and taking a secondary course of action if the global landmark uncertainty for the input image is above a threshold.

18. The controller of claim 1, wherein the global landmark uncertainty of an input image provides an uncertainty feedback that is used to improve the landmark localization for the image.

19. The controller of claim 18, wherein if the global landmark uncertainty of the input image is above a threshold, the processor is configured to:
- execute the landmark localization multiple times on the input image, each time using a different random perturbation and computing a global landmark uncertainty;
- compare the global landmark uncertainties; and
- select results of the execution of the landmark localization that yields a smallest global landmark uncertainty.

20. The controller of claim 1, wherein the task is part of a vehicle driver monitoring system.

* * * * *